US012706387B2

(12) United States Patent
Suzuki et al.

(10) Patent No.: US 12,706,387 B2
(45) Date of Patent: Aug. 11, 2026

(54) ANTENNA MODULE AND COMMUNICATION DEVICE

(71) Applicant: Murata Manufacturing Co., Ltd., Nagaokakyo (JP)

(72) Inventors: Sho Suzuki, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 110 days.

(21) Appl. No.: 18/743,184

(22) Filed: Jun. 14, 2024

(65) Prior Publication Data

US 2024/0332810 A1 Oct. 3, 2024

Related U.S. Application Data

(63) Continuation of application No. PCT/JP2022/046172, filed on Dec. 15, 2022.

(30) Foreign Application Priority Data

Dec. 21, 2021 (JP) ................................ 2021-207284

(51) Int. Cl.

*H01Q 13/08* (2006.01)
*H01Q 5/35* (2015.01)
*H01Q 21/06* (2006.01)

(52) U.S. Cl.

CPC ............... *H01Q 13/08* (2013.01); *H01Q 5/35* (2015.01); *H01Q 21/06* (2013.01)

(58) Field of Classification Search

CPC .......... H01Q 13/08; H01Q 5/35; H01Q 21/06; H01Q 5/40; H01Q 9/0407; H01Q 1/243; H01Q 9/42; H01Q 21/28

See application file for complete search history.

(56) References Cited

U.S. PATENT DOCUMENTS

2015/0295312 A1* 10/2015 Lee ........................ H01Q 21/28 343/845
2020/0328531 A1* 10/2020 Onaka ...................... H01Q 1/48

FOREIGN PATENT DOCUMENTS

JP 2013-123086 A 6/2013
WO WO-2020170722 A1 * 8/2020 .............. H01Q 1/38
WO 2020/261806 A1 12/2020
WO 2021/059671 A1 4/2021

OTHER PUBLICATIONS

International Search Report and Written Opinion mailed on Feb. 21, 2023, received for PCT Application PCT/JP2022/046172, filed on Dec. 15, 2022, 8 pages including English Translation.

* cited by examiner

*Primary Examiner* — Jason M Crawford
*Assistant Examiner* — Jose A. Miranda Gonzalez
(74) *Attorney, Agent, or Firm* — XSENSUS LLP

(57) ABSTRACT

An antenna module that includes a bent portion and a first flat portion. The first flat portion has a connection surface connected to the bent portion, a back surface intersecting the connection surface, a power feed pad connected to a flexible cable, a first ground electrode, and a radiating element. The first ground electrode is connected to a second ground electrode of the bent portion on the connection surface and is connected to the power feed pad.

21 Claims, 15 Drawing Sheets

ANTENNA MODULE AND COMMUNICATION DEVICE

CROSS-REFERENCE TO RELATED APPLICATIONS

This is a continuation application of PCT/JP2022/046172, filed on Dec. 15, 2022, designating the United States of America, which is based on and claims priority to Japanese Patent Application No. JP 2021-207284, filed on Dec. 21, 2021. The entire contents of the above-identified applications, including the specifications, drawings and claims, are incorporated herein by reference in their entirety.

TECHNICAL FIELD

The present disclosure relates to an antenna module and a communication device including the antenna module.

BACKGROUND ART

International Publication No. 2021/059671 (Patent Document 1) discloses an antenna module in which a radiating element and a ground electrode are disposed to face each other at a predetermined distance in an antenna board having a flat plate shape. In this antenna module, a power feed circuit supplies electric power to the radiating element to cause the radiating element to radiate a radio wave, and the power feed circuit also supplies electric power to the ground electrode to cause the ground electrode to serve as a one-side short-circuited patch antenna (a so-called inverted-F antenna) and to radiate a radio wave.

CITATION LIST

Patent Document

Patent Document 1: International Publication No. 2021/059671

SUMMARY OF DISCLOSURE

Technical Problem

A smartphone normally has a multiband antenna module that can radiate radio waves in frequency bands (so-called millimeter wave bands) centered at 28 GHz, 39 GHz, 60 GHz, and the like and a radio wave in a frequency band (a so-called sub-6 band) centered at 5 GHz to 6 GHz, which is lower than the millimeter wave bands. As smartphones have become more sophisticated in recent years, the space available for accommodating an antenna module in a smartphone tends to be limited.

As a countermeasure, it is considered that a ground electrode used as a ground of a radiating element for millimeter waves serves as an inverted-F antennas to radiate a sub-6 radio wave from the ground electrode, as described in Patent Document 1. That is, it is possible to reduce the number of radiating elements for a sub-6 band by using the ground electrode used as a ground of a radiating element for millimeter waves as a radiating element for a sub-6 band.

However, assuming a power feed line for millimeter waves and a power feed line for a sub-6 band are disposed in a single power feed path, there is a concern that the power feed path becomes larger.

The present disclosure addresses the problem described above and, in an antenna module or a communication device that radiates a radio wave in a first frequency band and a radio wave in a second frequency band lower than the first frequency band, has an object of reducing the number of radiating elements that radiate radio waves in the second frequency band while suppressing a power feed path to a radiating element that radiates radio waves in the first frequency band from becoming larger.

Solution to Problem

An antenna module according to the present disclosure includes a bent portion in which a first power feed line and a first ground electrode are disposed in a bent state, and a first flat portion connected to the bent portion. The first flat portion includes a connection surface connected to the bent portion, an intersection surface intersecting the connection surface, a side surface that differs from the connection surface and the intersection surface, an external terminal disposed on the intersection surface or the side surface, a second ground electrode that extends along the intersection surface and is connected to the first ground electrode and the external terminal, and a radiating element that is disposed to face the second ground electrode and is connected to the first power feed line. The radiating element radiates a radio wave in a first frequency band by receiving electric power through the first power feed line. The second ground electrode radiates a radio wave in a second frequency band lower than the first frequency band by receiving electric power through the external terminal.

A communication device according to the present disclosure includes the antenna module.

In the antenna module or the communication device, the radiating element of the first flat portion radiates a radio wave in a first frequency band (for example, a millimeter wave band) by receiving electric power through the first power feed line of the bent portion. The second ground electrode of the first flat portion is connected to the first ground electrode of the bent portion on the connection surface connected to the bent portion and radiates a radio wave in a second frequency band (for example, a sub-6 band) lower than the first frequency band by receiving electric power through the external terminal disposed on a surface (the intersection surface or the side surface) that differs from the connection surface. Assuming the external terminal is disposed on a surface that differs from the connection surface connected to the bent portion, the power feed line through which electric power is supplied to the external terminal can be provided outside the bent portion in which the first power feed line and the first ground electrode are disposed instead of in the bent portion. Accordingly, it is possible to use the second ground electrode used as a ground of the radiating element for the first frequency band as a radiating element for the second frequency band while suppressing the bent portion in which the first power supply line is disposed from becoming larger. As a result, the number of radiating elements for the second frequency band can be reduced while the power feed path for the first frequency band is suppressed from becoming larger.

Advantageous Effects of Disclosure

According to the present disclosure, in the antenna module or the communication device that radiates a radio wave in the first frequency band and a radio wave in the second frequency band lower than the first frequency band, it is possible to reduce the number of radiating elements that radiate radio waves in the second frequency band while suppressing the power feed path for the radiating element that radiates radio waves in the first frequency band from becoming larger.

DESCRIPTION OF EMBODIMENTS

Figure 1:
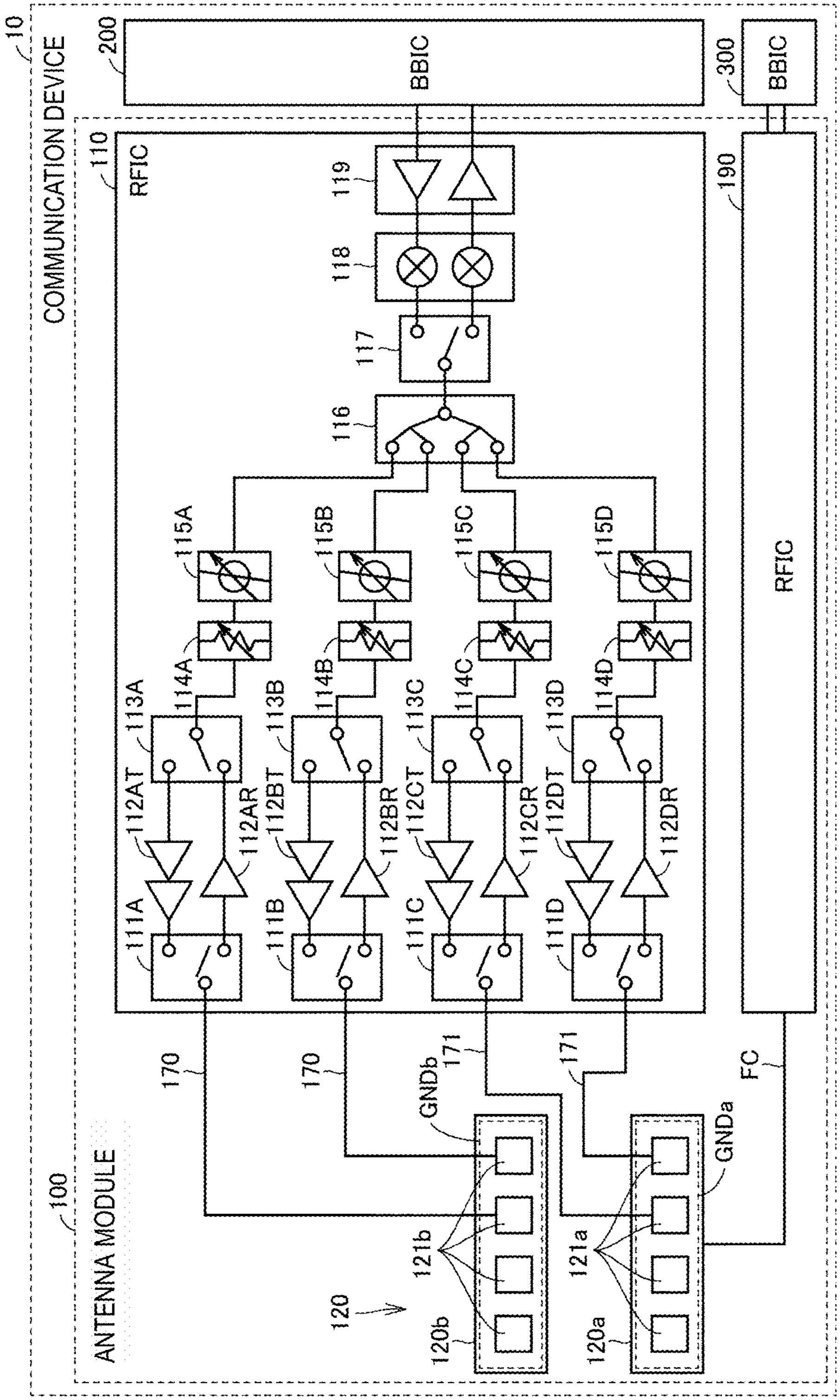
FIG. 1 is an example of a block diagram of a communication device to which an antenna module is applied.

Embodiments of the present disclosure will be described in detail below with reference to the drawings. It should be noted that the same or corresponding components in the drawings are denoted by the same reference numeral to omit the description thereof.

(Basic Structure of Communication Device)

FIG. 1 is an example of a block diagram of a communication device 10 to which an antenna module 100 according to an embodiment is applied. In the embodiment, the communication device 10 is assumed to be a smartphone. It should be noted that the communication device 10 is not limited to a smartphone and may be a mobile phone, a tablet, a personal computer with a communication function, or the like.

The antenna module 100 according to the embodiment is a so-called multiband antenna module that can radiate a radio wave in a first frequency band f1 and a radio wave in a second frequency band f2 lower than the first frequency band f1. For example, the first frequency band f1 is a so-called millimeter wave band (a frequency band centered at 28 GHz, 39 GHz, 60 GHz, or the like), and the second frequency band f2 is a so-called sub-6 band (frequency band centered at 5 GHz to 6 GHz).

Referring to FIG. 1, the communication device 10 includes the antenna module 100, and BBICs 200 and 300 that constitute a baseband signal processing circuit. The antenna module 100 includes RFICs 110 and 190 that are an example of the power feed circuit, and an antenna device 120.

The communication device 10 up-converts, into high-frequency signals, signals transmitted from the BBICs 200 and 300 to the antenna module 100 via the respective RFICs 110 and 190 and radiates the high-frequency signals from the antenna device 120. In addition, the communication device 10 transmits the high-frequency signals received by the antenna device 120 to the RFICs 110 and 190, down-converts the transmitted signals, and processes the down-converted signals in the BBICs 200 and 300.

The antenna device 120 includes a plurality of radiating elements 121*a* and 121*b*. The radiating elements 121*a* and 121*b* are both patch antennas having a flat plate shape.

In the embodiment, a plurality of (four in FIG. 1) radiating elements 121*a* are disposed one-dimensionally on a first flat portion 120*a* formed of a dielectric board having a flat plate shape. In addition, a plurality of (four in FIG. 1) radiating elements 121*b* are disposed one-dimensionally on a second flat portion 120*b* formed of a dielectric board having a flat plate shape. It should be noted that the radiating elements 121*a* need not be disposed one-dimensionally and may be disposed two-dimensionally. The number of the radiating elements 121*a* may be one. Similarly, the radiating element 121*b* are need not be disposed one-dimensionally and may be disposed two-dimensionally. The number of the radiating elements 121*b* may be one.

A ground electrode GNDa used as a ground for the radiating elements 121*a* is disposed on the first flat portion 120*a*. Assuming electric power is supplied from the RFIC 110 to the radiating elements 121*a*, electric lines of force are formed between the radiating elements 121*a* and the ground electrode GNDa, and radio waves in the first frequency band f1 are radiated from the radiating elements 121*a*.

A ground electrode GNDb used as a ground for the radiating elements 121*b* is disposed on the second flat portion 120*b*. Assuming electric power is supplied from the RFIC 110 to the radiating elements 121*b*, electric lines of force are formed between the radiating elements 121*b* and the ground electrode GNDb, and radio waves in the first frequency band f1 are radiated from the radiating elements 121*b*.

The RFIC 110 is a power feed circuit that corresponds to the first frequency band f1. It should be noted that, for ease of description, FIG. 1 illustrates a detailed structure corresponding to some portions of the radiating elements 121*a* and some portions of the radiating elements 121*b* and omits a detailed structure corresponding to the remaining portions of the radiating elements 121*a* and the remaining portions of the radiating element 121*b*.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal combiner/demultiplexer 116, a mixer 118, and an amplification circuit 119.

Assuming a high-frequency signal is transmitted, the switches 111A to 111D and 113A to 113D are switched to the power amplifiers 112AT to 112DT, and the switch 117 is connected to the transmission amplifier of the amplification circuit 119. Assuming a high-frequency signal is received, the switches 111A to 111D and 113A to 113D are switched to the low-noise amplifiers 112AR to 112DR, and the switch 117 is connected to the reception amplifier of the amplification circuit 119.

The signal transmitted from the BBIC 200 is amplified by the amplification circuit 119 and up-converted by the mixer 118. A transmission signal that is the up-converted high-frequency signal is split into four by the signal combiner/demultiplexer 116, split signals pass through four signal paths, and the signals are supplied to the radiating elements 121$a$ and 121$b$, respectively. At this time, the phase shift degrees of the phase shifters 115A to 115D disposed on the signal paths are individually adjusted, and accordingly, the directivity of the antenna device 120 can be adjusted. In addition, the attenuators 114A to 114D adjust the strengths of the transmission signals.

The reception signals that are high-frequency signals received by the radiating elements 121$a$ and 121$b$ pass through four different signal paths and are combined by the signal multiplexer/demultiplexer 116. The combined reception signal is down-converted by the mixer 118, amplified by the amplification circuit 119, and transmitted to the BBIC 200.

The RFIC 110 is formed as, for example, a one-chip integrated circuit component including the above circuit structure. Alternatively, the RFIC 110 may be formed as a separate integrated circuit component for each power feed circuit. In addition, the devices (a switch, a power amplifier, a low-noise amplifier, an attenuator, and a phase shifter) corresponding to each of the radiating elements may be formed as a one-chip integrated circuit component for each of the radiating elements.

The RFIC 190 is a power feed circuit that corresponds to the second frequency band f2. It should be noted that, because the structure of the RFIC 190 is the same as that of the RFIC 110, a detailed structure of the RFIC 190 is omitted.

The RFIC 190 is connected to the BBIC 300 and also connected to the ground electrode GNDa of the first flat portion 120$a$ via the flexible cable FC. The RFIC 190 up-converts the signal transmitted from the BBIC 300 and supplies the up-converted high-frequency signal to the ground electrode GNDa of the first flat portion 120$a$ via the flexible cable FC. An end portion of the ground electrode GNDa of the first flat portion 120$a$ is connected and grounded to the ground electrode GNDb of the second flat portion 120$b$, as described below. As a result, the ground electrode GNDa of the first flat portion 120$a$ serves as a so-called inverted-F antenna and radiates a radio wave in the second frequency band f2 by receiving electric power from the flexible cable FC. That is, the ground electrode GNDa used as a ground of the radiating element 121$a$ that radiates a radio wave in the first frequency band f1 is also used as a radiating element that radiates a radio wave in the second frequency band f2.

Figure 2:
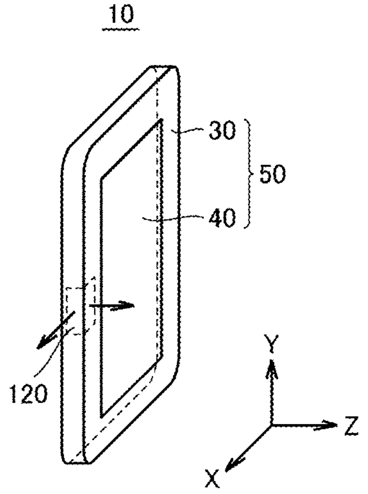
FIG. 2 is a perspective view of the communication device.

FIG. 2 is a perspective view of the communication device 10. The communication device 10 is a smartphone and is covered with a rectangular housing 50 including the case 30 and the display screen 40. The antenna device 120 is disposed in a substantially L-shape along a corner formed by the front surface (the surface on which the display screen 40 is disposed) and the side surface in the case 30 and radiates radio waves in the first frequency band f1 in two directions including the normal direction of the front surface of the case 30 and the normal direction of the side surface of the case 30.

In the following description, as illustrated in FIG. 2, the lateral direction of the housing 50 is also referred to as the "X-axis direction", the longitudinal direction of the housing 50 is also referred to as the "Y-axis direction", and the direction orthogonal to the Z-axis direction and the X-axis direction, that is, the normal direction of the front surface (the surface on which display screen 40 is disposed) of the housing 50 is also referred to as the "Z-axis direction".

(Structure of Antenna Module 100)

Figure 3:
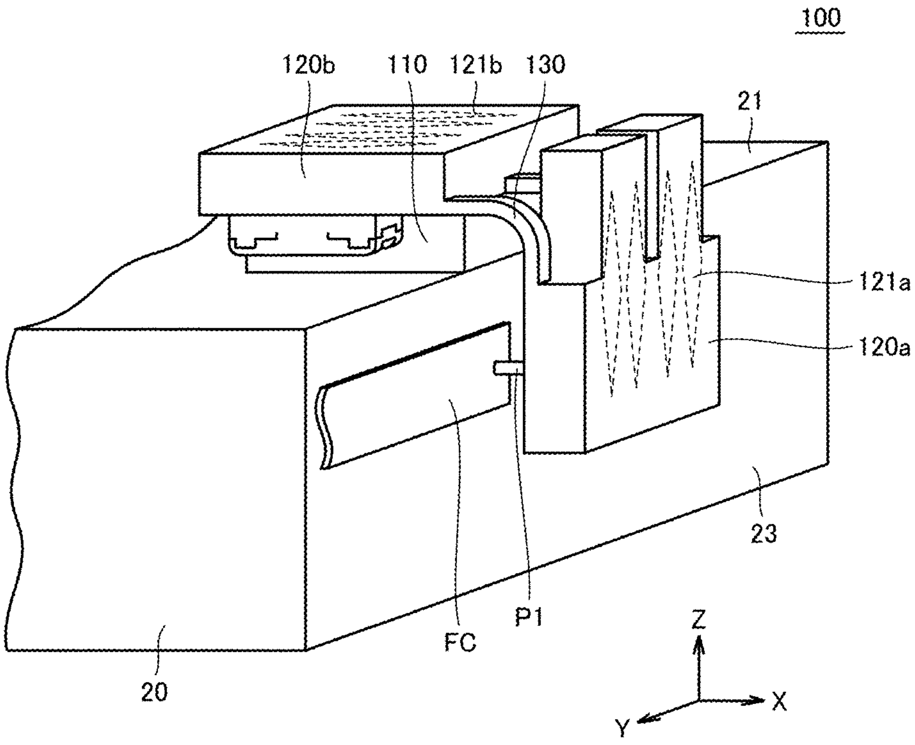
FIG. 3 is a perspective view (1) of the antenna module.
Figure 4:
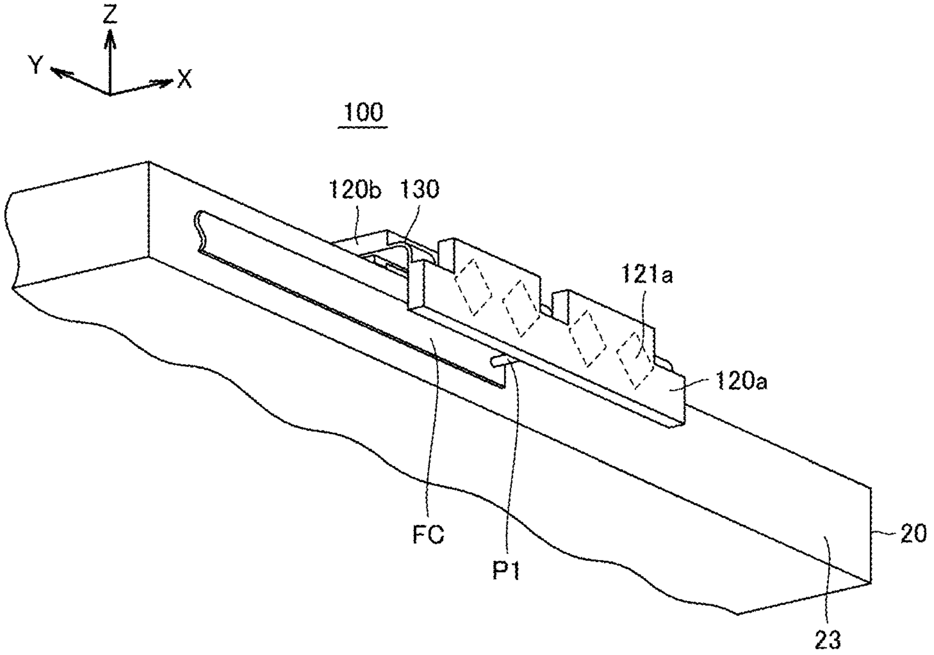
FIG. 4 is a perspective view (2) of the antenna module.
Figure 5:
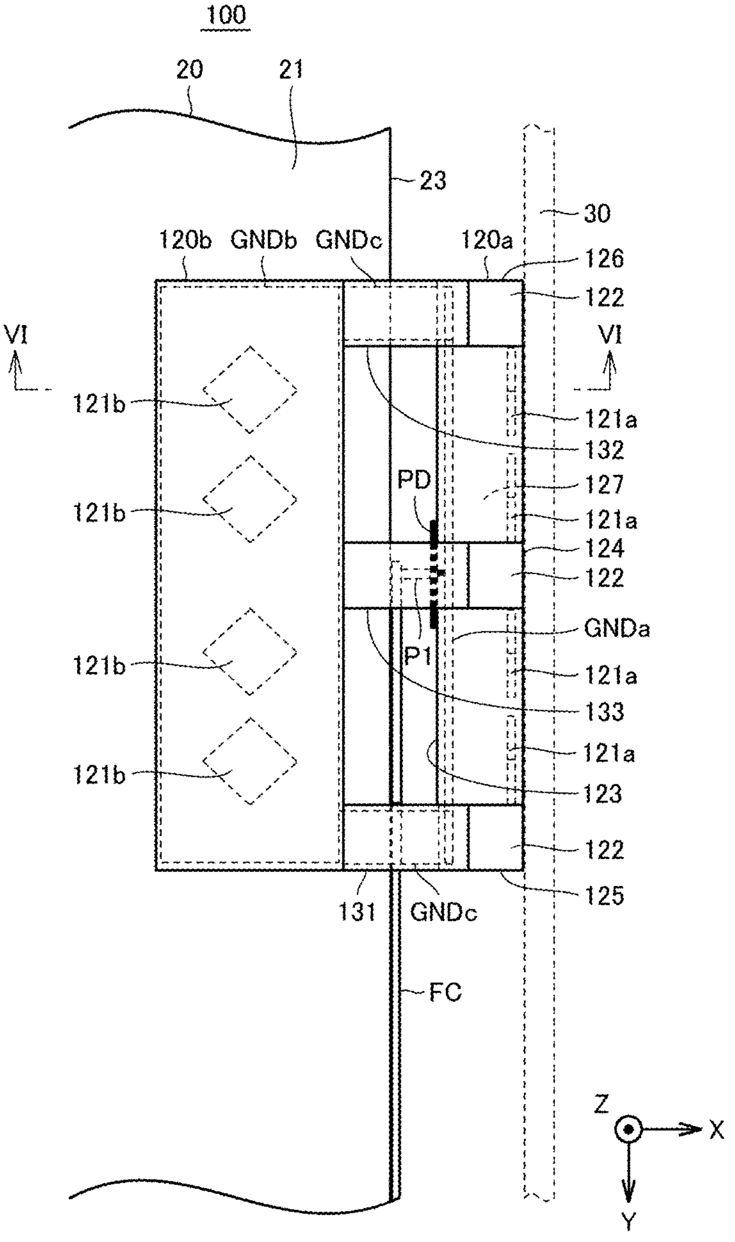
FIG. 5 is a plan view (1) of the antenna module.
Figure 6:
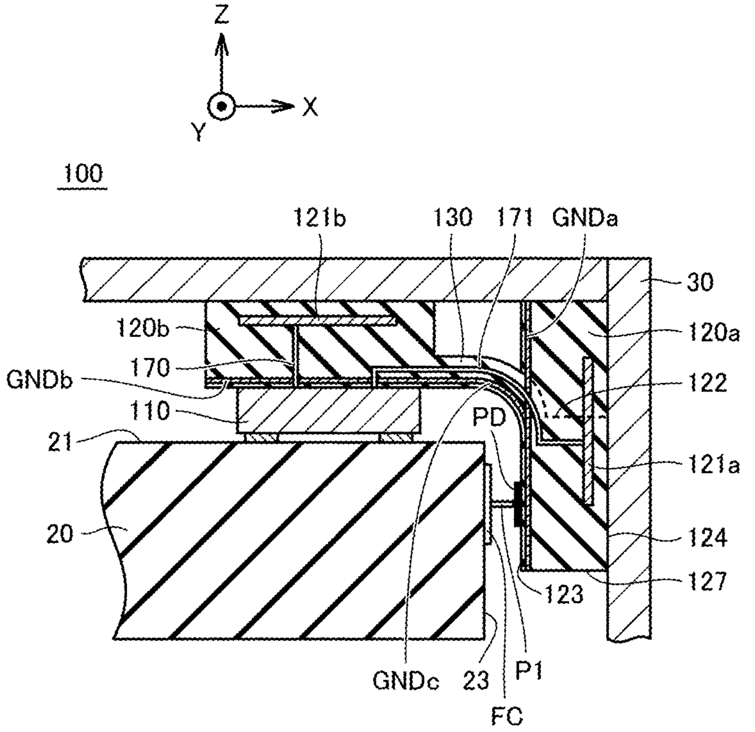
FIG. 6 is a cross-sectional view of the antenna module taken along line VI-VI in FIG. 5.

FIG. 3 is a perspective view of the antenna module 100 as viewed in a Z-axis positive direction. FIG. 4 is a perspective view of the antenna module 100 as viewed in a Z-axis negative direction. FIG. 5 is a plan view of the antenna module 100 as viewed in the Z-axis positive direction. FIG. 6 is a cross-sectional view of the antenna module 100 taken along line VI-VI in FIG. 5. The structure of the antenna module 100 according to the embodiment will be described with reference to FIGS. 3 to 6.

As described above, the antenna module 100 includes the first flat portion 120$a$ having a flat plate shape on which the radiating element 121$a$ is disposed and the second flat portion 120$b$ having a flat plate shape on which the radiating element 121$b$ is disposed. The antenna module 100 further includes the bent portion 130 that connects the first flat portion 120$a$ and the second flat portion 120$b$ to each other. It should be noted that the bent portion 130 is formed integrally with the first flat portion 120$a$ and the second flat portion 120$b$ in the embodiment.

The first flat portion 120$a$, the bent portion 130, and the second flat portion 120$b$ are disposed in a substantially L-shape along a corner of a rectangular metal chassis 20 disposed in the communication device 10. Specifically, the metal chassis 20 has a main surface 21 and a side surface 23 that is substantially orthogonal to the main surface 21. The first flat portion 120$a$ is disposed to face the side surface 23 of the metal chassis 20, and the second flat portion 120$b$ is disposed to face the main surface 21 of the metal chassis 20. The bent portion 130 is bent in a substantially L-shape along a corner formed by the side surface 23 and the main surface 21 of the metal chassis 20 to connect the first flat portion 120$a$ and the second flat portion 120$b$ having different normal directions.

The RFIC 110, which is a power feed circuit for the first frequency band f1, is disposed between the main surface 21 of the metal chassis 20 and the back surface (the surface in the Z-axis negative direction) of the second flat portion 120$b$. The flexible cable FC, which is a power feed line for the second frequency band f2, extends in the Y-axis direction along the side surface 23 of the metal chassis 20. An end portion of the flexible cable FC in a Y-axis negative direction is connected to the back surface of the first flat portion 120$a$ via a connection pin P1. It should be noted that the member in which the bent portion 130 and the second flat portion 120$b$ are disposed may only be a relatively large plate-shaped member that serves as a stable ground and is not necessarily limited to the metal chassis 20. For example, the member in which the bent portion 130 and the second flat portion 120$b$ are disposed may be a multi-layer board (motherboard), a heat diffusion board (formed of a graphite sheet), or the like.

In the embodiment, as illustrated in FIG. 5, three bent portions 131, 132, and 133 arranged at predetermined intervals in the Y-axis direction constitute the bent portion 130. The bent portion 131 is connected between an end portion of the first flat portion 120$a$ in a Y-axis positive direction and an end portion of the second flat portion 120$b$ in the Y-axis positive direction. The bent portion 132 is connected between an end portion of the first flat portion 120$a$ in the Y-axis negative direction and an end portion of the second flat portion 120$b$ in the Y-axis negative direction. The bent portion 133 is connected between a middle portion in the Y-axis direction of the first flat portion 120$a$ and a middle portion in the Y-axis direction of the second flat portion 120$b$.

In the embodiment, as illustrated in FIG. 5, ground electrodes GNDc are disposed in the bent portions 131 and 132 at both ends, but the ground electrode GNDc is not disposed in the bent portion 133 in the middle. Accordingly, both end portions in the Y-axis direction of the ground electrode GNDa of the first flat portion 120*a* are grounded to the ground electrode GNDb of the second flat portion 120*b* via the ground electrodes GNDc of the bent portions 131 and 132. It should be noted that the ground electrode GNDc may be disposed in the bent portion 133 in the middle.

The first flat portion 120*a*, the bent portion 130, and the second flat portion 120*b* have a multi-layer structure. As illustrated in FIG. 6, in the first flat portion 120*a*, the radiating element 121*a* and the ground electrode GNDa are disposed in this order at a predetermined distance in the X-axis negative direction from the X-axis positive direction. In the second flat portion 120*b*, the radiating element 121*b* and the ground electrode GNDb are disposed in this order at a predetermined distance in the Z-axis negative direction from the Z-axis positive direction. In the bent portion 130, the power feed line 171 and the ground electrode GNDc are disposed in this order from an outer peripheral side to an inner peripheral side.

In addition, the first flat portion 120*a* includes a connection surface 122 connected to the bent portion 130, a back surface (a surface in the X-axis negative direction) 123 substantially orthogonal to the connection surface 122, and a power feed pad PD disposed on the back surface 123. The back surface 123 is located closer to the inner periphery of the bent portion 130 than the connection surface 122. The power feed pad PD is connected to the flexible cable FC via the connection pin P1.

The ground electrode GNDa extends along the back surface 123 of the first flat portion 120*a* and is connected to the ground electrode GNDc of the bent portion 130 on the connection surface 122 of the first flat portion 120*a*. The power feed pad PD is connected to a substantially central portion of the ground electrode GNDa in the first flat portion 120*a*.

The ground electrode GNDa has a substantially rectangular shape with a longitudinal direction parallel to the Y-axis direction and a lateral direction parallel to the Z-axis direction as viewed in the X-axis direction (the normal direction of the back surface 123).

The radiating element 121*a* is disposed to face the ground electrode GNDa. The power feed line 171 is formed to extend in the first flat portion 120*a*, the bent portion 130, and second flat portion 120*b*. One end portion of the power feed line 171 is connected to the radiating element 121*a* in the first flat portion 120*a*. The other end portion of the power feed line 171 is connected to the RFIC 110. The radiating element 121*a* radiates a radio wave in the first frequency band f1 in the X-axis positive direction by receiving a high-frequency signal from the RFIC 110 via the power feed line 171.

The ground electrode GNDb extends along the back surface of the second flat portion 120*b* and is connected to the ground electrode GNDc of the bent portion 130. The ground electrode GNDb has a substantially rectangular shape with a longitudinal direction parallel to the Y-axis direction and a lateral direction parallel to the X-axis direction as viewed in the Z-axis direction. The radiating element 121*b* is disposed to face the ground electrode GNDb. The power feed line 170 is formed to extend in the second flat portion 120*b*. One end portion of the power feed line 170 is connected to the radiating element 121*b* in the second flat portion 120*b*. The other end portion of the power feed line 170 is connected to the RFIC 110. The radiating element 121*b* radiates a radio wave in the first frequency band f1 in the Z-axis positive direction by receiving a high-frequency signal from the RFIC 110 via the power feed line 170.

The RFIC 190 for the second frequency band f2 illustrated in FIG. 1, which is not illustrated in FIGS. 2 to 6, is provided on a motherboard mounted on the metal chassis 20 or a chassis other than the metal chassis 20 and is connected to the flexible cable FC. Assuming the high-frequency signal from the RFIC 190 is supplied to the ground electrode GNDa of the first flat portion 120*a* via the flexible cable FC, the ground electrode GNDa serves as an inverted-F antenna and radiates a radio wave in the second frequency band f2 in the X-axis positive direction.

As described above, the antenna module 100 according to the embodiment includes the bent portion 130 and the first flat portion 120*a*. In the bent portion 130, the power feed line 171 and the ground electrode GNDc are disposed in a bent state. The first flat portion 120*a* includes the connection surface 122 connected to the bent portion 130, the back surface 123 intersecting the connection surface 122, the power feed pad PD disposed on the back surface 123, the ground electrode GNDa, and the radiating element 121*a*. The radiating element 121*a* is connected to the power feed line 171. The ground electrode GNDa is connected to the ground electrode GNDc of the bent portion 130 on the connection surface 122 and is also connected to the power feed pad PD.

In the antenna module 100 having the structure described above, the radiating element 121*a* of the first flat portion 120*a* radiates a radio wave in the first frequency band f1 by receiving electric power through the first power feed line 171 of the bent portion 130. In addition, the ground electrode GNDa of the first flat portion 120*a* is connected (grounded) to the ground electrode GNDc of the bent portion 130 on the connection surface 122 connected to the bent portion 130 and radiates a radio wave in the second frequency band f2 by receiving electric power from the power feed pad PD disposed on the back surface 123 orthogonal to the connection surface 122. Because the power feed pad PD is disposed on the back surface 123 instead of the connection surface 122 connected to the bent portion 130, the flexible cable FC for supplying electric power to the power feed pad PD is provided outside the bent portion 130 instead of in the bent portion 130. Accordingly, because the ground electrode GNDa used as a ground of the radiating element 121*a* for the first frequency band f1 can also be used as a radiating element for the second frequency band f2 while the bent portion 130 is suppressed from becoming larger, the number of radiating elements for the second frequency band f2 can be reduced.

In addition, the antenna module 100 according to the embodiment further includes the second flat portion 120*b* connected to the first flat portion 120*a* via the bent portion 130. The communication device 10 includes the metal chassis 20. The metal chassis 20 has the main surface 21 facing the second flat portion 120*b* and the side surface 23 facing the first flat portion 120*a*. The RFIC 110, which is a power feed circuit, is disposed between the second flat portion 120*b* and the main surface 21 of the metal chassis 20, but no power feed circuit is disposed between the first flat portion 120*a* and the side surface 23 of the metal chassis 20. By taking advantage of this, the power feed pad PD is disposed on the back surface 123 of the first flat portion 120*a*, the flexible cable FC is disposed in a region between the back surface 123 of the first flat portion 120*a* and side surface 23 of the metal chassis 20, and electric power is supplied from the back surface 123 of the first flat portion

120*a* to the ground electrode GNDa. As a result, the space between the back surface 123 of the first flat portion 120*a* and the side surface 23 of the metal chassis 20 can be effectively used as a power feed path for the second frequency band f2.

In addition, in the antenna module 100 according to the embodiment, the ground electrode GNDa of the first flat portion 120*a* has a substantially rectangular shape with a longitudinal direction parallel to the Y-axis direction and a lateral direction parallel to the Z-axis direction as viewed in the X-axis direction. In addition, both end portions of the ground electrode GNDa in the Y-axis direction are grounded to the ground electrode GNDb of the second flat portion 120*b* via the ground electrodes GNDc of the bent portions 131 and 132. Furthermore, the ground electrode GNDa is connected to the power feed pad PD in a portion located substantially centrally in the Y-axis direction (the longitudinal direction) and in the Z-axis direction (the lateral direction). This ensures symmetry of the ground portion of the ground electrode GNDa with respect to the power feed point of the ground electrode GNDa, the radio wave radiated from the ground electrode GNDa can be radiated properly in the X-axis direction, and the directivity can be improved.

In addition, the antenna module 100 according to the embodiment is installed in the communication device 10 having a flat plate shape. In addition, the first flat portion 120*a* is disposed on the side surface of the communication device 10. Accordingly, the side surface of a smartphone can be effectively used as an installation space of the antenna module 100.

"Antenna module 100" and "communication device 10" according to the embodiment may correspond to "antenna module" and "communication device" according to the present disclosure, respectively. In addition, "power feed line 171", "ground electrode GNDc", "bent portion 130", "first flat portion 120*a*", and "flexible cable FC" according to the embodiment may correspond to "first power feed line", "first ground electrode", "bent portion", "first flat portion", and "second power feed line" according to the present disclosure, respectively. In addition, "connection surface 122", "back surface 123", "power feed pad PD", and "ground electrode GNDa" according to the embodiment may correspond to "connection surface", "intersection surface", "external terminal", and "second ground electrode" according to the present disclosure, respectively.

In addition, "second flat portion 120*b*", "metal chassis 20", "main surface 21", and "side surface 23" according to the embodiment may correspond to "second flat portion", "plate-shaped member", "main surface" of the plate-shaped member, and "side surface" of the plate-shaped member according to the present disclosure, respectively.

In addition, "bent portion 131" and "bent portion 132" according to the embodiment may correspond to "first bent portion" and "second bent portion" according to the present disclosure, respectively.

[Modification 1]

In the embodiment described above, an example in which the first flat portion 120*a*, the second flat portion 120*b*, and the bent portion 130 are formed integrally with each other has been described. However, the first flat portion 120*a*, the second flat portion 120*b*, and the bent portion 130 need not be formed integrally with each other.

Figure 7:
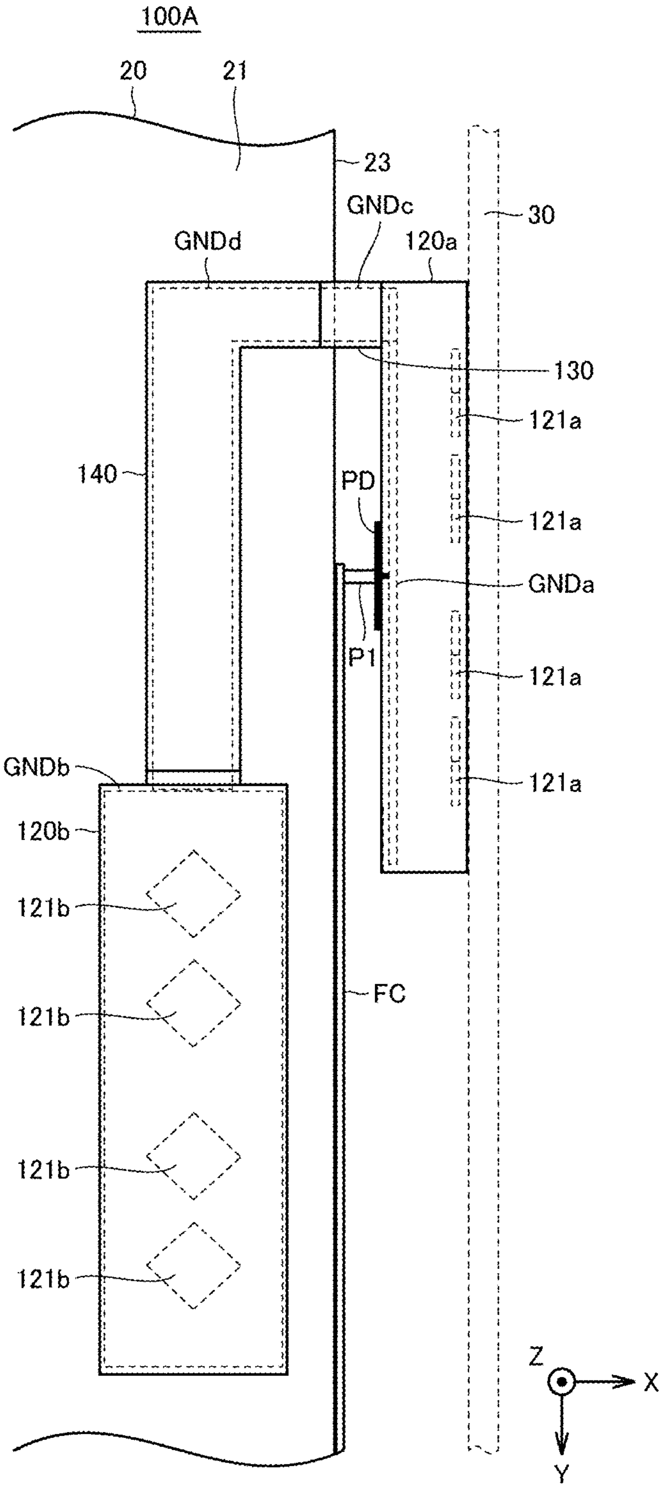
FIG. 7 is a plan view (2) of an antenna module.

FIG. 7 is a plan view of an antenna module 100A according to modification 1 as viewed in the Z-axis positive direction. The antenna module 100A differs from the antenna module 100 according to the embodiment described above in the following points.

In the antenna module 100A, the first flat portion 120*a*, the second flat portion 120*b*, and the bent portion 130 are formed separately from each other. The second flat portion 120*b* is disposed at a position offset in the Y-axis positive direction from the first flat portion 120*a*. The bent portion 130 is formed of, for example, a flexible cable and is connected to an end portion in the Y-axis negative direction of the first flat portion 120*a* with the bent portion 130 bent in a substantially L-shape. The bent portion 130 and the second flat portion 120*b* are connected to each other by a connection member 140 disposed on the main surface 21 of the metal chassis 20.

A ground electrode GNDd is disposed on the connection member 140. The ground electrode GNDc of the bent portion 130 and the ground electrode GNDb of the second flat portion 120*b* are connected to each other by the ground electrode GNDd of the connection member 140.

As described above, the first flat portion 120*a*, the second flat portion 120*b*, and the bent portion 130 may be formed separately from each other.

[Modification 2]

In the embodiment and modification 1 described above, an example in which an end portion of the flexible cable FC and the power feed pad PD of the first flat portion 120*a* are connected to each other by the connection pin P1 has been described.

However, the member that connects the flexible cable FC and the first flat portion 120*a* to each other is not necessarily limited to the connection pin P1 and may be, for example, a pogo pin, a solder bump, or a spring contact.

Figure 8:
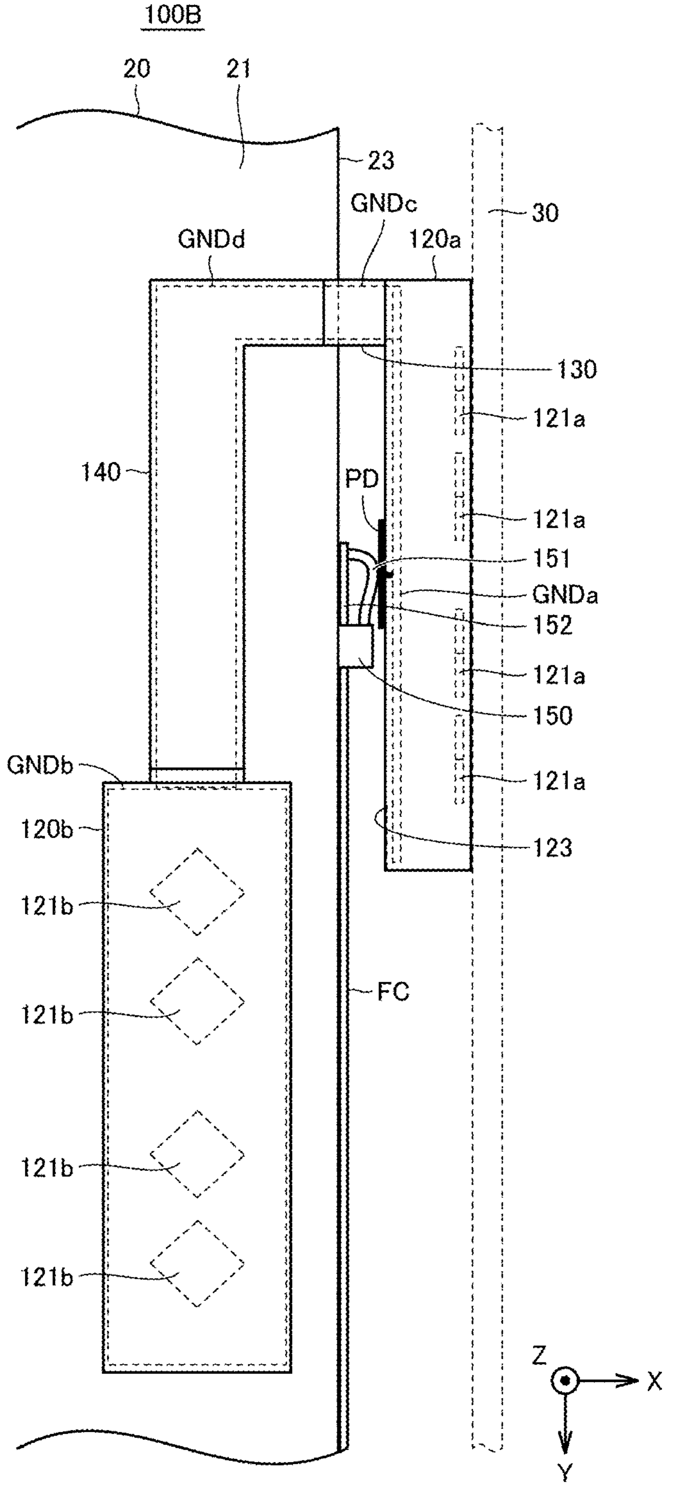
FIG. 8 is a plan view (3) of an antenna module.

FIG. 8 is a plan view of an antenna module 100B according to modification 2 as viewed in the Z-axis positive direction. In the antenna module 100B, the connection pin P1 of the antenna module 100A according to modification 2 described above is replaced with a spring contact 150. The remaining structure of the antenna module 100B is the same as that of the antenna module 100A described above.

The spring contact 150 is mounted at an end portion of the flexible cable FC. The spring contact 150 includes a first terminal 151 that is elastically deformed in the X-axis direction by an external force and a second terminal 152 that is electrically connected to a power feed line in the flexible cable FC.

Figure 9:
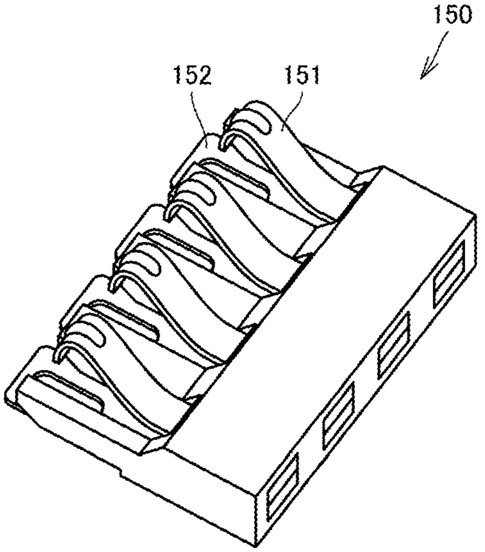
FIG. 9 is a perspective view of a spring contact.

FIG. 9 is a perspective view of the spring contact 150. FIG. 9 illustrates an example in which four pairs consisting of the first terminal 151 and the second terminal 152 are arranged.

The first terminal 151 is bent into a substantially L-shape that projects toward a side away from the second terminal 152 with the end portion thereof facing the second terminal 152. The first terminal 151 is disposed such that the end portion thereof does not come into contact with the second terminal 152 in an initial state in which no external force acts. Assuming an external force toward the second terminal 152 acts on the first terminal 151, the first terminal 151 elastically deforms, and the end portion of the first terminal 151 comes into contact with the second terminal 152.

In modification 2, because the spring contact 150 is inserted into a portion between the side surface 23 of the metal chassis 20 and the back surface 123 of the first flat portion 120*a* assuming the flexible cable FC is disposed on the side surface 23 of the metal chassis 20, the first terminal 151 of the spring contact 150 comes into contact with the power feed pad PD of the first flat portion 120*a*. At this time, because the first flat portion 120*a* is in contact with the case 30 and is not displaced in the X-axis positive direction, the first terminal 151 receives a reaction force in the X-axis negative direction from the first flat portion 120*a* and elastically deforms, and accordingly, the end portion of the first terminal 151 comes into contact with the second terminal 152. As a result, the power feed pad PD of the first flat portion 120*a* is electrically connected to the flexible cable FC via the spring contact 150. At the same time, pushing back of the spring easily determines the position of the first flat portion 120*a* relative to the case 30 and easily stabilizes the resonant frequency of the antenna for the first frequency band f1 and the second frequency band f2.

As described above, because the spring contact 150 connects the flexible cable FC and the power feed pad PD of the first flat portion 120*a* to each other, electrical connection between the flexible cable FC and the power feed pad PD of first flat portion 120*a* becomes easy and stable. It should be noted that "spring contact 150" according to modification 2 may correspond to "spring contact" according to the present disclosure.

[Modification 3]

In the embodiment described above, an example in which the bent portion 130 connecting the first flat portion 120*a* and the second flat portion 120*b* to each other includes the three bent portions 131, 132, and 133, and the first flat portion 120*a* and the second flat portion 120*b* are connected to each other at both ends and in the middle in the Y-axis direction has been described.

However, the number and the range of the bent portions 130 that connect the first flat portion 120*a* and the second flat portion 120*b* to each other are not necessarily limited to those described above.

Figure 10:
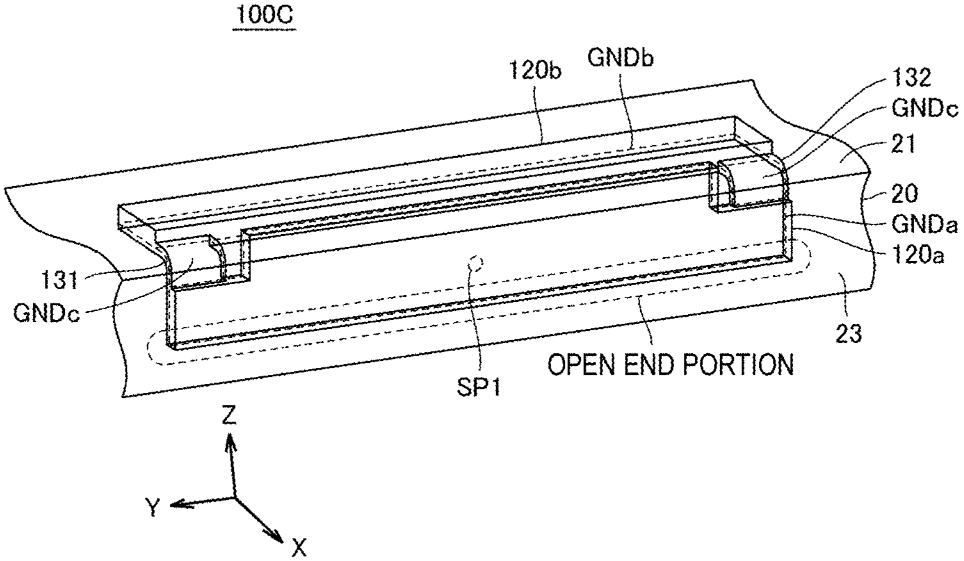
FIG. 10 is a perspective view (3) of an antenna module.

FIG. 10 is a perspective view of an antenna module 100C according to modification 3. In the antenna module 100C, the bent portion 133 in the middle of the antenna module 100 according to the embodiment described above is omitted. The remaining structure of the antenna module 100C is the same as that of the antenna module 100 according to the embodiment described above.

In the antenna module 100C, both end portions in the Y-axis direction of the end surface of the ground electrode GNDa in the Z-axis positive direction are grounded to the ground electrode GNDb of the second flat portion 120*b* via the ground electrodes GNDc of the bent portions 131 and 132. In addition, a power feed point SP1 through which electric power from the flexible cable FC is supplied is provided in a substantially central portion of the ground electrode GNDa. As a result, the ground electrode GNDa of the first flat portion 120*a* receives electric power through the power feed point SP1, serves as an inverted-F antenna having an open-end portion in the Z-axis negative direction, and radiates a radio wave in the second frequency band f2.

Figure 11:
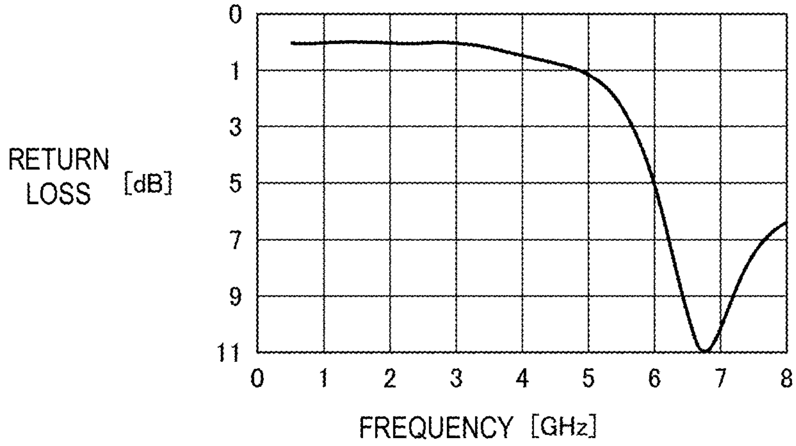
FIG. 11 is a diagram (1) illustrating the frequency characteristics of return loss.

FIG. 11 is a diagram illustrating the frequency characteristics of return loss assuming a radio wave in the second frequency band f2 are radiated from the ground electrode GNDa of the antenna module 100C. In FIG. 11, the horizontal axis represents the frequency (GHz), and the vertical axis represents the return loss as the attenuation.

The return loss is the ratio of the reflected electric power to the electric power input to the antenna device, expressed in decibels (dB). In the case of total reflection (assuming reflectivity is 100%), the value of the return loss is 0 dB, and the value of the reflection loss becomes larger as the reflection is smaller. In other words, as the value of return loss becomes lager, the power loss due to the return itself is lower, the returned electric power is lower, and more electric power is input to the antenna.

As illustrated in FIG. 11, in the antenna module 100C, the value of return loss in a frequency band centered at around 6.5 GHz is large. That is, the frequency band centered at around 6.5 GHz is the second frequency band f2 in the antenna module 100C.

It should be noted that the center frequency of the second frequency band f2 can be adjusted by adding a matching circuit to the ground electrode GNDa.

Figure 12:
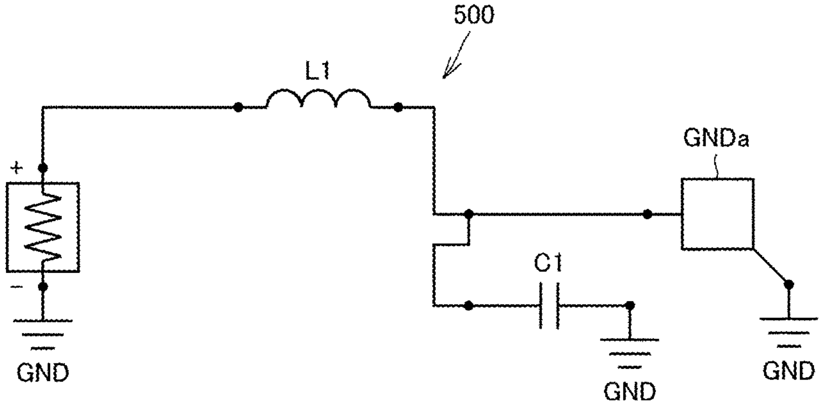
FIG. 12 is a diagram (1) illustrating an example of a matching circuit.

FIG. 12 is a diagram illustrating an example of a matching circuit 500 to be added to the ground electrode GNDa of the antenna module 100C. The center frequency of the second frequency band f2 can be reduced by adding the matching circuit 500 with a capacitance of C1 and an inductance of L1 as illustrated in FIG. 12.

Figure 13:
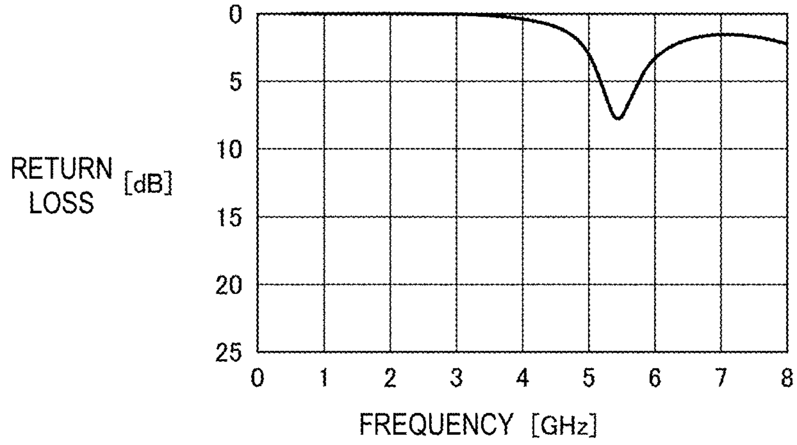
FIG. 13 is a diagram (2) illustrating the frequency characteristics of return loss.

FIG. 13 is a diagram illustrating the frequency characteristics of return loss of the antenna module 100C to which the matching circuit 500 has been added. It can be seen from FIG. 13 that the center frequency of the second frequency band f2 has dropped from around 6.5 GHz to around 5.5 GHz by adding the matching circuit 500. That is, the second frequency band f2 can be matched to a so-called sub-6 band by adding the matching circuit 500.

[Modification 4]

Figure 14:
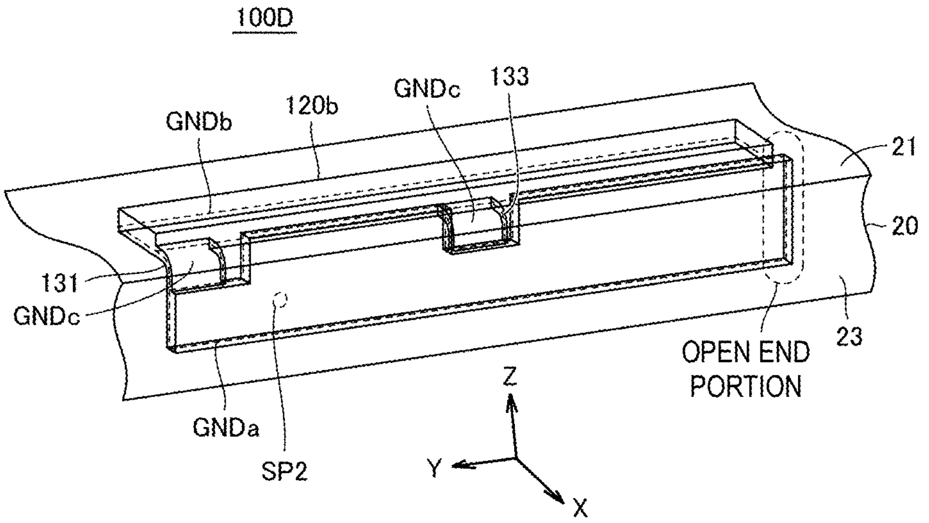
FIG. 14 is a perspective view (4) of an antenna module.

FIG. 14 is a perspective view of an antenna module 100D according to modification 4. In the antenna module 100D, the bent portion 132 in the Y-axis negative direction of the antenna module 100 according to the embodiment described above is omitted, and the ground electrode GNDc is added to the bent portion 133 in the middle in the Y-axis direction.

In the antenna module 100D, an end portion and a middle portion in the Y-axis positive direction of the end surface of the ground electrode GNDa in the Z-axis positive direction are grounded to the ground electrode GNDb of the second flat portion 120*b* via the ground electrodes GNDc of the bent portions 131 and 133. In addition, a power feed point SP2 through which electric power from the flexible cable FC is supplied is provided in a region of the ground electrode GNDa closer to the bent portion 131 than the middle in the Y-axis direction of the ground electrode GNDa. The remaining structure of the antenna module 100D is the same as that of the antenna module 100 according to the embodiment described above.

In the antenna module 100D, the ground electrode GNDa of the first flat portion 120*a* serves as an inverted-F antenna having an open-end portion in the Y-axis negative direction and radiates a radio wave in the second frequency band f2 by receiving electric power through the power feed point SP2.

Figure 15:
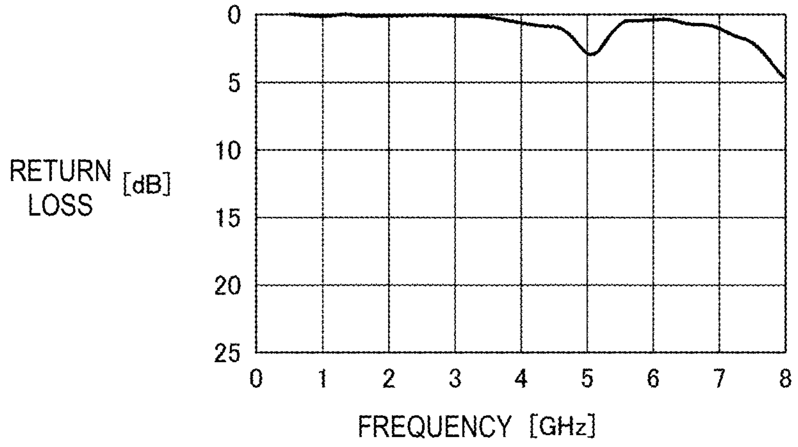
FIG. 15 is a diagram (3) illustrating the frequency characteristics of return loss.

FIG. 15 is a diagram illustrating the frequency characteristics of return loss assuming a radio wave in the second frequency band f2 is radiated from the ground electrode GNDa of the antenna module 100D. As illustrated in FIG. 15, the frequency band centered at around 5.0 GHz is the second frequency band f2 in the antenna module 100D.

That is, in the antenna module 100D, one end portion of the ground electrode GNDa in the Y-axis direction (the longitudinal direction) is grounded to the ground electrode GNDc of the bent portion 131, and the power feed point SP2 is disposed in a region closer to the bent portion 131 than the middle in the Y-axis direction of the ground electrode GNDa. As a result, the distance from the power feed point SP2 to the open-end portion (the end portion in the Y-axis negative direction) is longer than that in the antenna module 100C illustrated in modification 3 described above, the second frequency band f2 can be lowered to the sub-6 frequency band.

It should be noted that the width of the second frequency band f2 can be adjusted by adding the matching circuit to the ground electrode GNDa.

Figure 16:
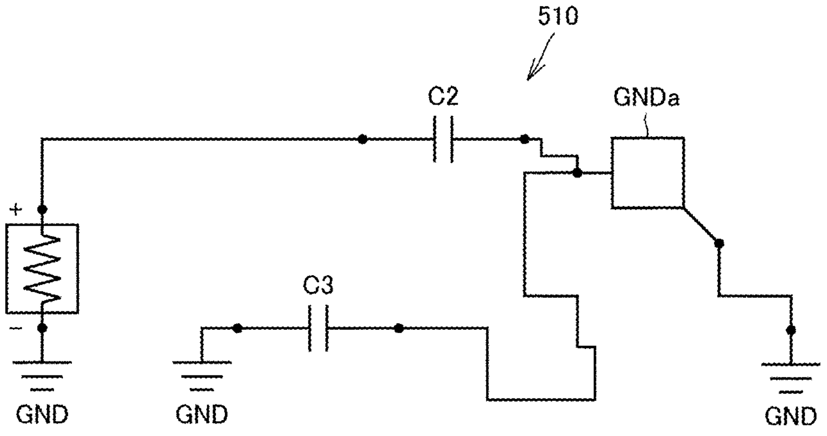
FIG. 16 is a diagram (2) illustrating an example of a matching circuit.

FIG. 16 is a diagram illustrating an example of a matching circuit 510 to be added to the ground electrode GNDa of the antenna module 100D. The width of the second frequency band f2 can be increased by adding the matching circuit 510 with a capacitance of C2 and a capacitance of C3 as illustrated in FIG. 16.

Figure 17:
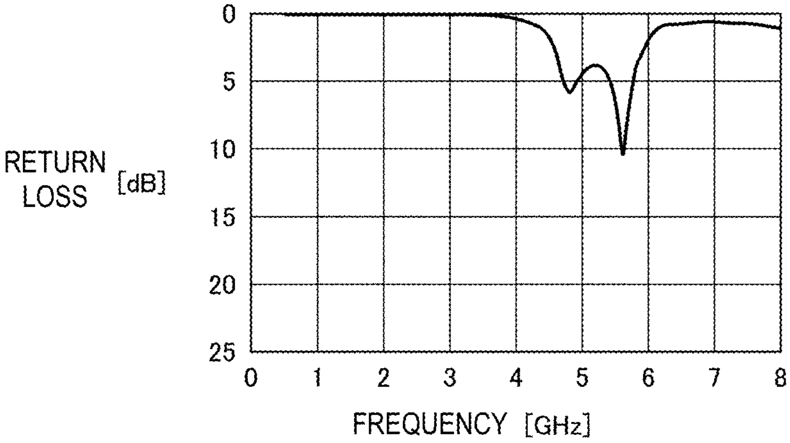
FIG. 17 is a diagram (4) illustrating the frequency characteristics of return loss.

FIG. 17 is a diagram illustrating the frequency characteristics of return loss of the antenna module 100D to which the matching circuit 510 has been added. It can be seen from FIG. 17 that addition of the matching circuit 510 increases the value of return loss in a wider frequency band compared with the case in which the matching circuit 510 is not present.

In the antenna module 100D, of the ground electrode GNDa in the Z-axis positive direction, not only is the bent portion 131 provided at the end portion in the Y-axis positive direction, but the bent portion 133 is also provided in a middle portion. This is effective in realizing equal length wiring of the power feed lines 171 connected to the radiating elements 121*a* of the first flat portion 120*a*. That is, assuming only the bent portion 131 in the Y-axis positive direction is provided, because all of the power feed lines 171 connected to the radiating element 121*a* pass through the bent portion 131, the lengths of the four power feed lines 171 connected to the four radiating elements 121*a* are likely to differ from each other. On the other hand, assuming the bent portion 133 is also provided in a middle portion in the Y-axis direction, the power feed lines 171 connected to the radiating elements 121*a* can pass through the bent portion 133, and accordingly, the difference in lengths of the four power feed lines 171 connected to the four respective radiating elements 121*a* can be minimized.

[Modification 5]

In the embodiment and modifications 1 to 5 described above, an example in which the power feed pad PD of the first flat portion 120*a* is disposed on the back surface 123 of the first flat portion 120*a* has been described, but the power feed pad PD may be disposed on a surface other than the back surface 123 of the first flat portion 120*a*. For example, the power feed pad PD may be disposed on the front surface 124 (the surface in the X-axis positive direction facing the back surface 123 (see FIGS. 5 and 6)) of the first flat portion 120*a*, and the flexible cable FC may be connected to the power feed pad PD. Alternatively, the power feed pad PD may be disposed on one of the side surfaces 125 to 127 (that is, the end surface 125 in the Y-axis positive direction, the end surface 126 in the Y-axis negative direction, and the end surface 127 in the Z-axis negative direction (see FIGS. 5 and 6)) that differ from the connection surface 122, the back surface 123, and the front face 124 of the first flat portion 120*a*, and the flexible cable FC may be connected to the power feed pad PD.

[Modification 6]

The dimension of the first flat portion 120*a* in the Y-axis direction is identical to the dimension of the second flat portion 120*b* in the Y-axis direction in the antenna module 100 according to the embodiment described above, but the dimension of the first flat portion 120*a* in the Y-axis direction may differ from the dimension of the second flat portion 120*b* in the Y-axis direction.

Figure 18:
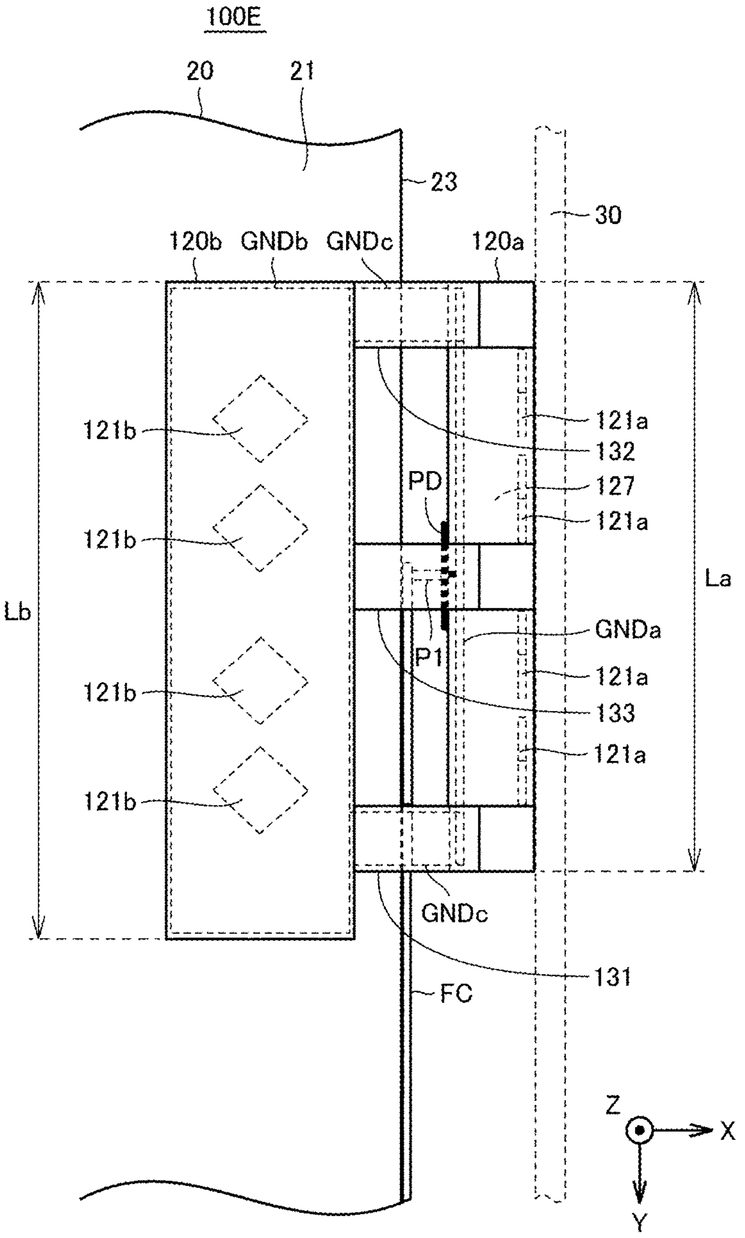
FIG. 18 is a plan view (4) of an antenna module.

FIG. 18 is a plan view of an antenna module 100E according to modification 6 as viewed in the Z-axis positive direction. In this antenna module 100E, a dimension La of the first flat portion 120*a* in the Y-axis direction is smaller than a dimension Lb of the second flat portion 120*b* in the Y-axis direction.

As described above, the dimension of the first flat portion 120*a* in the Y-axis direction may differ from the dimension of the second flat portion 120*b* in the Y-axis direction. As a result, the second frequency band f2 radiated from the ground electrode GNDa of the first flat portion 120*a* that serves as an inverted-F antenna can be adjusted.

In addition, assuming the dimension La of the first flat portion 120*a* in the Y-axis direction is smaller than the dimension Lb of the second flat portion 120*b* in the Y-axis direction as illustrated in FIG. 18, even assuming, for example, a sub-6 band antenna other than the antenna module 100E is disposed in the housing 50, interference between the sub-6 band antenna and the antenna module 100E can be easily suppressed, and accordingly, it is expected that isolation between the sub-6 band antenna and the antenna module 100E is ensured and the correlation coefficient is improved. Accordingly, assuming the sub-6 band antenna and the antenna module 100E are used in MIMO (Multi Input Multi Output), the radiation efficiency can be improved, the disturbance of directivity can be suppressed, and accordingly, the MIMO performance can be improved.

[Modification 7]

The angle formed by the normal direction of the first flat portion 120*a* and the normal direction of the second flat portion 120*b* is substantially 90 degrees in the antenna module 100 according to the embodiment described above, but the angle formed by the normal direction of the first flat portion 120*a* and the normal direction of the second flat portion 120*b* is not necessarily limited to substantially 90 degrees and can be adjusted arbitrarily.

Figure 19:
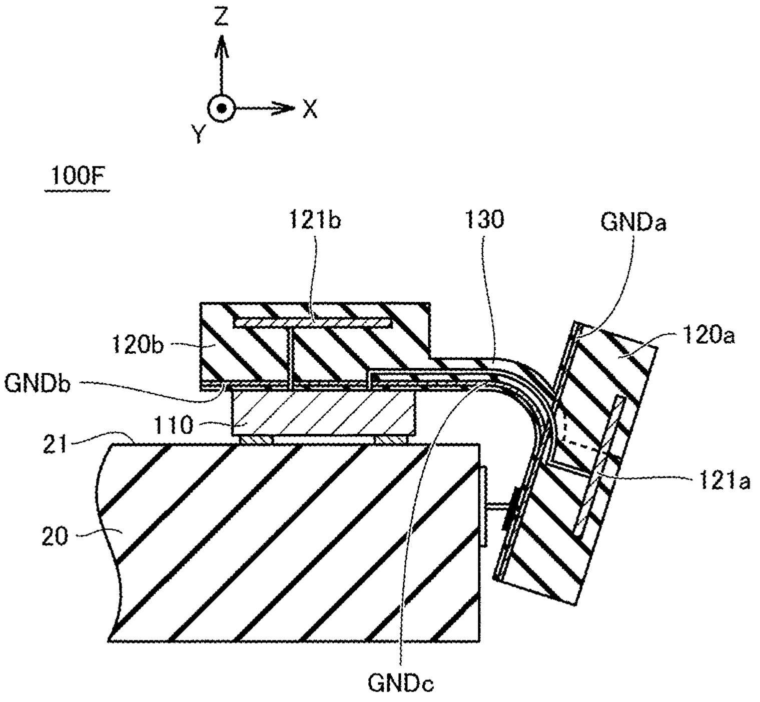
FIG. 19 is a cross-sectional view of an antenna module.

FIG. 19 is a cross-sectional view of an antenna module 100F according to modification 7. It should be noted that the case 30 and the like are not illustrated in FIG. 19.

In this antenna module 100F, the angle (the angle formed by the ground electrode GNDa and the ground electrode GNDb) formed by the normal direction of the first flat portion 120*a* and the normal direction of the second flat portion 120*b* is smaller than 90 degrees (approximately 75 degrees).

Because the relative distance between the ground electrode GNDa that serves as an inverted-F antenna and the ground electrodes around the ground electrode GNDa can be adjusted by changing the angle formed by the normal direction of the first flat portion 120*a* and the normal direction of the second flat portion 120*b* as described above, the Q value of the inverted-F antenna can be adjusted. The directivity of the inverted-F antenna can also be adjusted.

[Modification 8]

In the embodiment described above, an example in which the bent portion 130 that connects the first flat portion 120*a* and the second flat portion 120*b* to each other includes the three bent portions 131, 132, and 133, and the three bent portions 131, 132, and 133 are disposed at both ends and in the middle in the Y-axis direction has been described. However, the number and the disposition of the bent portions 130 are not necessarily limited to those described above.

Figure 20:
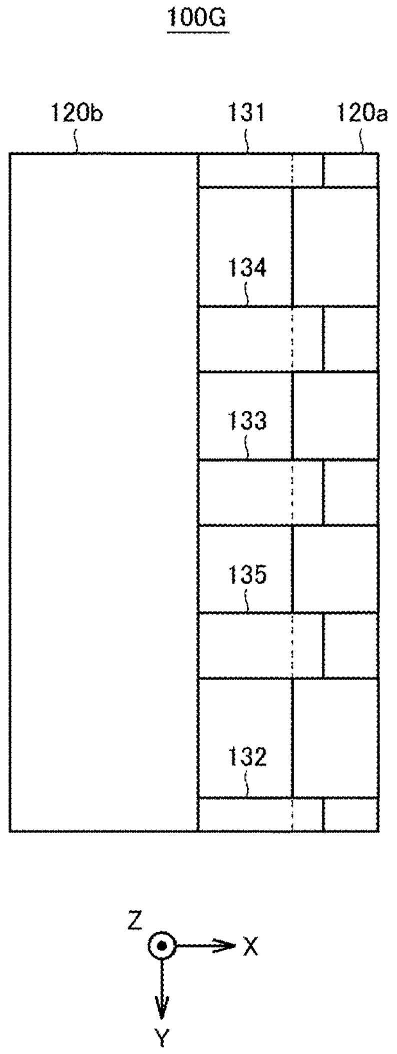
FIG. 20 is a plan view (5) of an antenna module.

FIG. 20 is a plan view of an antenna module 100G according to modification 8 as viewed in the Z-axis positive direction. It should be noted that components other than the first flat portion 120*a*, the second flat portion 120*b*, and the bent portion 130 are not illustrated in FIG. 20.

In this antenna module 100G, the bent portion 130 includes five bent portions 131 to 135. The bent portions 131, 132, and 133 are disposed at both ends and in the middle in the Y-axis direction. The bent portion 134 is disposed between the bent portion 131 and the bent portion 133. The bent portion 135 is disposed between the bent portion 132 and the bent portion 133.

Figure 21:
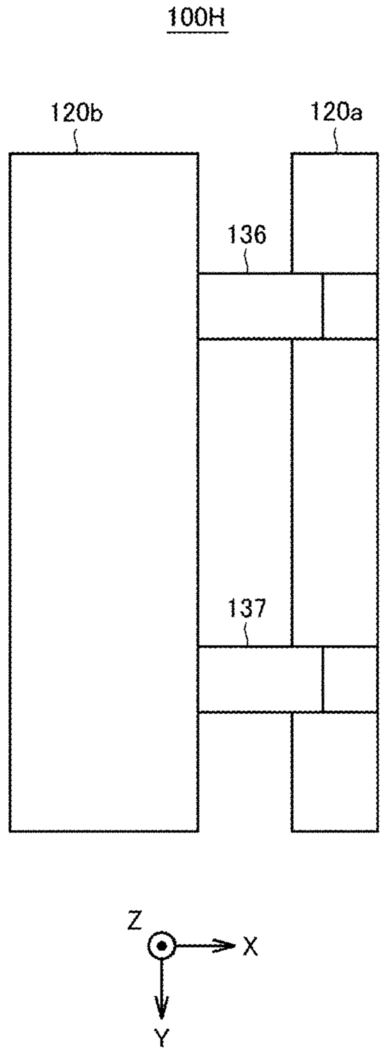
FIG. 21 is a plan view (6) of an antenna module.

FIG. 21 is a plan view of an antenna module 100H according to modification 8 as viewed in the Z-axis positive direction. It should be noted that components other than the first flat portion 120*a*, the second flat portion 120*b*, and the bent portion 130 are not illustrated in FIG. 21.

In this antenna module 100H, the bent portion 130 includes two bent portions 136 and 137. The bent portions 136 and 137 are disposed at positions other than both ends in the Y-axis direction at a predetermined distance.

Because the position at which the ground electrode GNDa that serves as an inverted-F antenna is connected to the ground electrode GNDc of the bent portion 130 can be adjusted by changing the number and the disposition of the bent portions 130 as appropriate as described above, the frequency of the inverted-F antenna can be adjusted.

The embodiment disclosed herein should be considered in all respects as exemplary and not restrictive. The scope of the present disclosure is indicated by the claims rather than by the above description of the embodiment, and is intended to include the meaning equivalent to the claims and all changes within the claims.

REFERENCE SIGNS LIST

10 communication device
20 metal chassis
21 main surface
23 side surface
30 case
40 display screen
50 housing
100, 100A to 100H antenna module
111A to 113D, 117 switch
112AR to 112DR low-noise amplifier
112AT to 112DT power amplifier
114A to 114D attenuator
115A to 115D phase shifter
116 demultiplexer
118 mixer
119 amplification circuit
120 antenna device
120*a* first flat portion
120*b* second flat portion
121*a*, 121*b* radiating element
122 connection surface
123 back surface
130, 131 to 137 bent portion
140 connection member
150 spring contact
151 first terminal
152 second terminal
170, 171 power feed line
500, 510 matching circuit
FC flexible cable
GNDa to GNDd ground electrode
P1 connection pin
PD power feed pad
SP1, SP2 power feed point

The invention claimed is:

1. An antenna module comprising:
a bent portion in which a first power feed line and a first ground electrode are disposed in a bent state; and
a first flat portion connected to the bent portion,
wherein the first flat portion has
a connection surface connected to the bent portion,
an intersection surface intersecting the connection surface,
a side surface that differs from the connection surface and the intersection surface,
an external terminal disposed on the intersection surface or the side surface,
a second ground electrode that extends along the intersection surface and is connected to the first ground electrode and the external terminal, and
a radiating element that is disposed to face the second ground electrode and is connected to the first power feed line, and
the radiating element radiates a radio wave in a first frequency band by receiving electric power through the first power feed line, and
the second ground electrode radiates a radio wave in a second frequency band lower than the first frequency band by receiving electric power through the external terminal.

2. The antenna module according to claim 1,
wherein the intersection surface is located closer to an inner periphery of the bent portion than the connection surface.

3. The antenna module according to claim 2,
wherein the second ground electrode has a rectangular shape having a longitudinal direction and a lateral direction as viewed in a normal direction of the intersection surface, and
the bent portion includes
a first bent portion on which a ground electrode connected to one end portion of the second ground electrode in the longitudinal direction is disposed, and
a second bent portion on which a ground electrode connected to another end portion of the second ground electrode in the longitudinal direction is disposed.

4. The antenna module according to claim 3,
wherein the second ground electrode is connected to the external terminal in a portion located substantially centrally in the longitudinal direction and in the lateral direction.

5. The antenna module according to claim 2,
wherein the second ground electrode has a rectangular shape having a longitudinal direction and a lateral direction as viewed in a normal direction of the intersection surface, and
the first ground electrode is connected to one end portion of the second ground electrode in the longitudinal direction.

6. The antenna module according to claim 5,
wherein the second ground electrode is connected to the external terminal in a region closer to the bent portion than a portion located centrally in the longitudinal direction.

7. A communication device comprising:
the antenna module according to claim 6.

8. The communication device according to claim 7, further comprising:
a second power feed line; and
a plate-shaped member,
wherein the antenna module further includes a second flat portion connected to the first flat portion via the bent portion,
the plate-shaped member has
a main surface facing the second flat portion, and a side surface intersecting the main surface, the external terminal of the first flat portion faces the side surface of the plate-shaped member, and the second power feed line extends along the side surface of the plate-shaped member in a region between the plate-shaped member and the first flat portion.

9. The communication device according to claim 8, wherein the external terminal and the second power feed line are electrically connected to each other by a spring contact.

10. The communication device according to claim 9, further comprising:

a power feed circuit disposed between the second flat portion and the main surface of the plate-shaped member, the power feed circuit supplying electric power to the first power feed line of the bent portion.

11. The communication device according to claim 10, wherein the communication device has a flat plate shape, and the first flat portion is disposed on the side surface of the communication device.

12. The antenna module according to claim 11, wherein the second ground electrode is connected to the external terminal in a portion located substantially centrally in the longitudinal direction and in the lateral direction.

13. The antenna module according to claim 12, wherein the second ground electrode is connected to the external terminal in a region closer to the bent portion than a portion located centrally in the longitudinal direction.

14. The communication device according to claim 13, wherein the communication device has a flat plate shape, and the first flat portion is disposed on the side surface of the communication device.

15. The communication device according to claim 9, wherein the communication device has a flat plate shape, and the first flat portion is disposed on the side surface of the communication device.

16. The communication device according to claim 8, further comprising:

a power feed circuit disposed between the second flat portion and the main surface of the plate-shaped member, the power feed circuit supplying electric power to the first power feed line of the bent portion.

17. The communication device according to claim 8, wherein the communication device has a flat plate shape, and the first flat portion is disposed on the side surface of the communication device.

18. The communication device according to claim 7, wherein the communication device has a flat plate shape, and the first flat portion is disposed on the side surface of the communication device.

19. The antenna module according to claim 1, wherein the second ground electrode has a rectangular shape having a longitudinal direction and a lateral direction as viewed in a normal direction of the intersection surface, and the bent portion includes a first bent portion on which a ground electrode connected to one end portion of the second ground electrode in the longitudinal direction is disposed, and a second bent portion on which a ground electrode connected to another end portion of the second ground electrode in the longitudinal direction is disposed.

20. A communication device comprising:

the antenna module according to claim 19.

21. The antenna module according to claim 1, wherein the second ground electrode has a rectangular shape having a longitudinal direction and a lateral direction as viewed in a normal direction of the intersection surface, and the first ground electrode is connected to one end portion of the second ground electrode in the longitudinal direction.

* * * * *